United States Patent Office 2,865,758
Patented Dec. 23, 1958

2,865,758

CRANBERRIES AND PROCESS OF PREPARING THE SAME

Kenneth G. Weckel, Madison, Wis., assignor to Wisconsin Alumni Research Foundation, Madison, Wis., a corporation of Wisconsin No Drawing. Application May 7, 1957
Serial No. 657,483

5 Claims. (Cl. 99—102)

The present invention relates to cranberries and an improved method for processing the same. More specifically the invention is directed to the processing of whole cranberries in a form suitable for use in the bakery, confectionery, frozen dessert, mixed fruit, beverage and the like fields.

Cranberries are used extensively as a seasonal market item in the fresh berry form for home use. Commercial use of cranberries in processed products, however, has been limited for the most part to cranberry sauce, jellies and the like, the use of which is also traditionally seasonable, e. g., during the cold weather periods and especially the holidays Thanksgiving, Christmas and New Year's.

The need for finding new uses for cranberries, and specifically the development of a whole cranberry product that could and would be widely used throughout all seasons, has been recognized by the cranberry industry for years. To solve this problem extended research investigations have been carried out by workers in this field. One of the best available solutions to the problem is described in Weckel et al. U. S. Patent No. 2,692,831. The maraschino style cranberries described in this patent, however, are substantially devoid of natural color as well as natural flavor and satisfactory color and flavor via artificial ingredients is not easily achieved. For this reason, investigations have continued, the search being directed to a processed cranberry having not only the original desired shape but also the color and flavor or modified flavor of the natural berry. One of the primary difficulties was found to reside in the great tendency of the fresh cranberry, unlike the cherry, to disintegrate on processing and attempts to avoid this resulted in an unattractive product in which the discrete character of the cranberry was lost. Both of these difficulties are particularly pronounced when fresh unprocessed berries are subjected to the baking or cooking temperatures associated with the preparation of commercial foodstuffs.

The principal object of the present invention is to provide a novel processed cranberry product characterized by the color and flavor of the natural berry.

Another object is to provide a processed cranberry of good flavor characterized by its natural plumpness and firmness and which does not disintegrate during or after processing.

Still another object of the invention is to provide a novel cranberry product which retains the color of the natural berry and is suitable for use in the bakery, confectionery, frozen dessert, mixed fruit, beverage and like fields.

Other objects will be apparent as the description proceeds.

During the investigations various means were tried to get sugar or syrup into the berry and at the same time retain its original shape as well as natural color and flavor. One approach called for the use of syrups along with elevated temperatures, e. g. around 150° F., to lower the viscosity of the syrup and facilitate its being taken up by the berry. This resulted in a soft and mushy product. The more or less standard approach of having the fruit slowly equilibrated with sugar solutions of gradually increasing concentrations was also tried but likewise proved unsatisfactory. Due to the long processing period, this latter procedure also proved especially objectionable as it required the use of preservatives or refrigerating temperatures to protect the product from spoilage while being processed.

During the investigations it was found that when unpunched cranberries were held in highly concentrated syrups containing about 65–70% sugar (about the highest possible concentration at room temperature) that the concentration in the berry ran only to about 5–10% depending on berry size, etc. With further investigation it was then discovered that a satisfactory product containing about 25–65% sugar solids based on the weight of the product, could be readily obtained by using a vacuum treatment and concentrated sugar syrups as described below.

The following examples will serve to illustrate the invention.

Example I

The cranberries, graded to remove damaged berries, are first washed with water and then punched or pierced. The puncturing may be accomplished in various ways known in the art for pricking fruit. The punctures, about 4–8 in number using No. 16 brads, should penetrate about halfway into each air sac of the berry with about six punctures distributed around each berry being preferred. The berries are then submerged at room temperature in a vessel containing an aqueous sucrose syrup made up of about 40 to 65% of sugar solids and a small amount of an agent such as 0.05 to 1% calcium chloride or alum based on the syrup and berries. The head space is next slowly evacuated to about 15 to about 28 inches of mercury, with a pressure of about 25" Hg being one of the preferred. The submerged berries are held at the low pressure for about 15 to 20 minutes or until a test shows the berries to contain about 35–55% sugar by weight. They are then brought to atmospheric pressure slowly. Additional vacuum treatments may be desired under certain conditions. Where lower percentages, e. g. 25–30% of sugar in the berry are desired syrups containing 40–50% sugar solids can be employed. For berries containing higher percentages of sugar the highly concentrated syrups should be employed. After the vacuum treatment the berries are preferably heated to about 180° F., filled into containers with hot syrup and heat processed at that temperature for approximately 20 minutes. The containers are then allowed to cool. The processed berries can be stored in the containers or maintained in the frozen state. For the ice cream trade, a preferred product contains about 42% sugar. At this concentration the berries will not freeze in the cream and thus are not hard and icy.

Example II

The cranberries are graded, washed and punched or pierced as in Example I. The punctured berries are then submerged in the cold (e. g. room temperature) in a vessel containing an aqueous sucrose syrup made up of about 40–65% sugar solids. The head space is next slowly evacuated to about 15 to about 28 inches of mercury, with a pressure range of about 20–25" Hg being one of the preferred. The submerged berries are held at the low pressure for about 15 to 20 minutes or until a test shows the berries to contain about 35–55% sugar by weight. They are then brought to atmospheric pressure slowly and removed from the sugar syrup.

About 150 pounds of the sugar syrup treated berries are next submerged at room temperature in about 293 pounds of spiced syrup made up of about 95 pounds of water, 180 pounds of sucrose, 4.25 pounds of vinegar, 6 pounds of spices, 7 pounds of salt and 0.75 pound of alum and subjected to another vacuum treatment similar to that described above. The berries are then removed from the syrup and after draining filled cold into jars or like containers. The spiced syrup is next heated to about 180–200° F. and the hot syrup filled into the jars with the berries. The jars are then capped in accordance with standard capping procedures in the art. The resulting product in which the berries are firm and plump and retain their desired red color remains stable and can be stored for long periods of time.

The alum, like the calcium chloride or mixtures of the same, should be used in a range of about 0.05 to 1 percent. The spices (usually a blend of spices), salt and vinegar or like condiments can be employed in various amounts to suit the taste. Optimum amounts can be readily ascertained for any particular purpose by preliminary test.

It is important that the berries prior to and during the vacuum treatment or treatments be maintained below 130° F. as the use of temperatures above 130° F., even if maintained only briefly, result in a soft unsatisfactory product. Likewise, equivalent heat treatments including extended holding at related temperatures a little below 130° F. deleteriously affect the product. It is for this reason that temperatures around room temperature are preferred for processing up until the completion of the vacuum treatment. After this treatment the cranberries withstand high temperatures very well.

The total time of the vacuum treatment including the drawing of the vacuum, holding period and release of the vacuum runs from about 45 to 75 minutes with an hour being generally satisfactory. This short period required for processing is highly advantageous as it makes the use of preservatives, e. g. benzoate of soda, sulfur dioxide, etc., or refrigerated temperatures unnecessary. The drawing and release of the vacuum slowly, e. g. over a 10–20 minute period, is preferred as rapid changes in the pressure may result in the rupture of the berries. Stirring or induced agitation can be employed during the vacuum treatment to aid in the uptake of sugar by the berries. The aqueous sugar syrups employed can be made up of cane sugar, corn syrup (glucose) and the like and mixtures of the same.

Investigations have shown the agent (calcium chloride, calcium lactate, potassium aluminum sulfate or other equivalent non-toxic calcium salts or alums) to be an important ingredient in the production of the processed cranberries. It appears in some way to be responsible for the ability of the processed berry, as distinguished from the unprocessed berry, to withstand temperatures of 130° F. and higher. While amounts of calcium chloride or alum in excess of 1% (based on the weight of the syrup and berries) can be employed, the use of greater amounts has not been found to have any substantial beneficial effect on the firmness and stability of the product. The use of excessive amounts which deleteriously affect the berry, e. g. give a bitter taste to the delicate flavor of the fruit, should be avoided. At calcium chloride or alum levels much below 0.05% (based on the weight of the syrup and berries), the product differs little from the mushy berries produced by the old cranberry processing methods. Optimum amounts of calcium salt or alum for particular processing conditions can be readily ascertained by preliminary test. In Example I, the agent (calcium chloride) is introduced into the cranberry in the initial vacuum treatment, and in Example II, the agent (alum) is introduced into the cranberry in the second vacuum treatment. The point of introduction is immaterial as long as the calcium chloride or alum or equivalent agent is introduced into the cranberry with the syrup prior to the heat treatment of 130° F. and above.

The pH of the cranberries should be maintained below 3.9, otherwise the color of the berries darkens and product quality is impaired both from a visual and flavor standpoint. The normal acidity of the berries (in the absence of alkaline materials) is adequate to maintain the desired pH level and it is for this reason that the improper use of alkaline materials should be avoided. If an artificial dye is used (although not required by the process herein described) it is important that the dye be added to the processing syrups containing calcium chloride or alum or the like just before addition of the acid berries. If the dye is allowed to stand for some time in the processing syrups prior to addition of the cranberries, the berries, when added, tend to take on a dark, translucent quality which is considered to be unpleasant in this art.

Up until the invention described above it was considered essential to employ sulfur dioxide ($SO_2$) in the treatment of cranberrices as is done in the processing of maraschino cherries. However, I have found that sulfur dioxide is not required with the relatively short vacuum treatment or treatments of the present invention. This has proven highly advantageous as sulfur dioxide bleaches the red color and deleteriously affects the flavor of the cranberry.

The processed cranberries of the present invention are firm and plump and retain the natural color and natural flavor (unless modified with spices, etc., as in Example II) of the natural berry. Where desired, they can be further treated with highly concentrated sugar syrups to produce products containing 65–70% sugar as well as products of the glace type.

The present application is a continuation-in-part of my prior copending application Serial No. 511,763, filed May 27, 1955, now abandoned.

I claim:

1. The process of preparing cranberries suitable for use in the bakery, confectionery, frozen dessert, mixed fruit, beverage and like fields which comprises puncturing the air sacs in the cranberries, submerging the punctured cranberries in a concentrated aqueous sugar syrup containing a small amount of an agent selected from the group consisting of calcium chloride and alum and subjecting the cranberries in the syrup to a vacuum treatment, the temperature of the berries being maintained below 130° F. until completion of the vacuum treatment.

2. The processed cranberries produced by the process of claim 1.

3. The process of preparing cranberries suitable for use in the bakery, confectionery, frozen dessert, mixed fruit, beverage and like fields which comprises puncturing the air sacs in the cranberries, submerging the punctured cranberries in a concentrated aqueous sugar syrup containing about 40–65% of sugar solids and a small amount of calcium chloride and subjecting the cranberries in the syrup to a vacuum of about 15–28 inches of mercury, the temperature of the berries being maintained at room temperature until completion of the vacuum treatment.

4. The process of preparing cranberries suitable for use in the bakery, confectionery, frozen dessert, mixed fruit, beverage and like fields which comprises puncturing the air sacs in the cranberries, submerging the punctured cranberries in a concentrated aqueous sugar syrup containing at least about 40% sugar solids and a small amount of calcium chloride, subjecting the cranberries in the syrup to a vacuum of about 25 inches of mercury, maintaining the temperature of the berries at about room temperature until completion of the vacuum treatment and then subjecting the berries to a heat treatment while in syrup to a temperature of about 180° F.

5. The method of processing whole cranberries which comprises puncturing the air sacs in the cranberries, submerging the punctured cranberries in a concentrated aqueous sugar syrup containing 40–65% sugar solids, subjecting the cranberries in the syrup to a vacuum treatment at room temperature, subjecting the treated cranberries to another vacuum treatment at room temperature in a sugar syrup containing a small amount of alum, draining the syrup from the cranberries, placing the drained cranberries in a container, heating the syrup to about 180-200° F., pouring the heated syrup over the cranberries in the container and sealing the container.

References Cited in the file of this patent

UNITED STATES PATENTS

| | | |
|---|---|---|
| 2,629,665 | Gordon | Feb. 24, 1953 |
| 2,692,831 | Weckel et al. | Oct. 26, 1954 |
| 2,700,614 | Critzman | Jan. 25, 1955 |

OTHER REFERENCES

Article from "The Canner," vol. 88, #7, page 26, published 1938, "The Effect of Calcium on Plant Tissues," by Z. I. Kertesz.